UNITED STATES PATENT OFFICE.

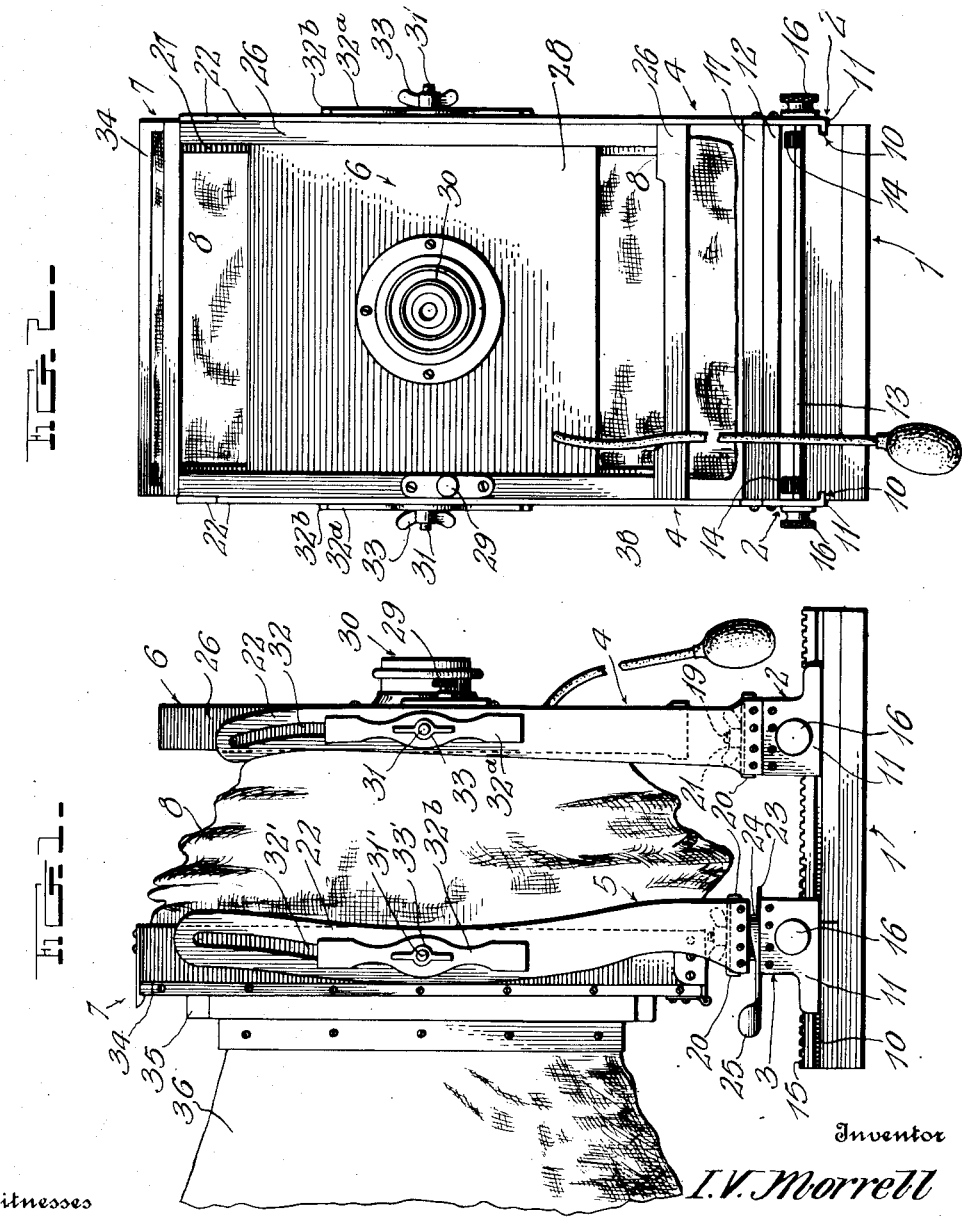

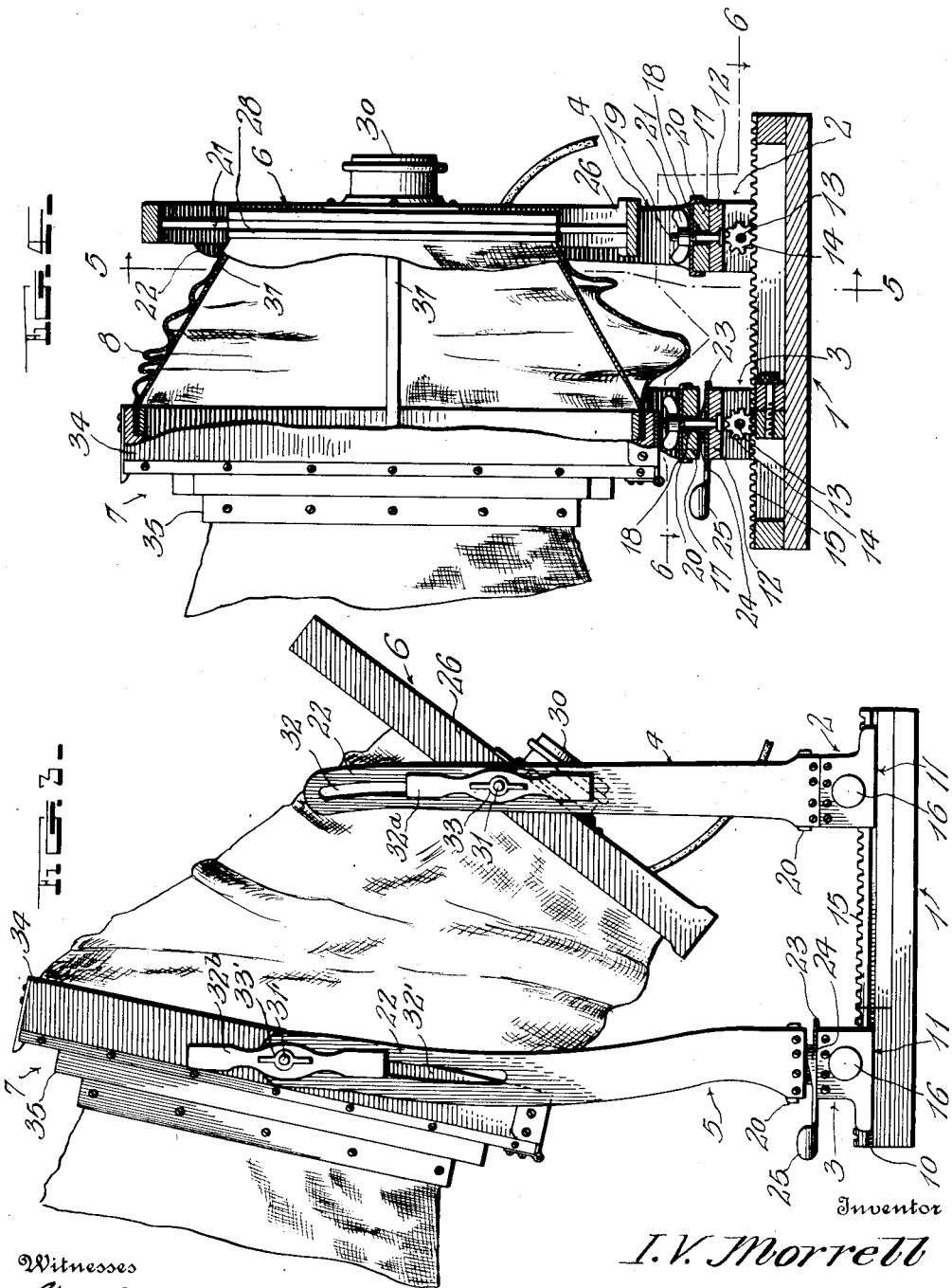

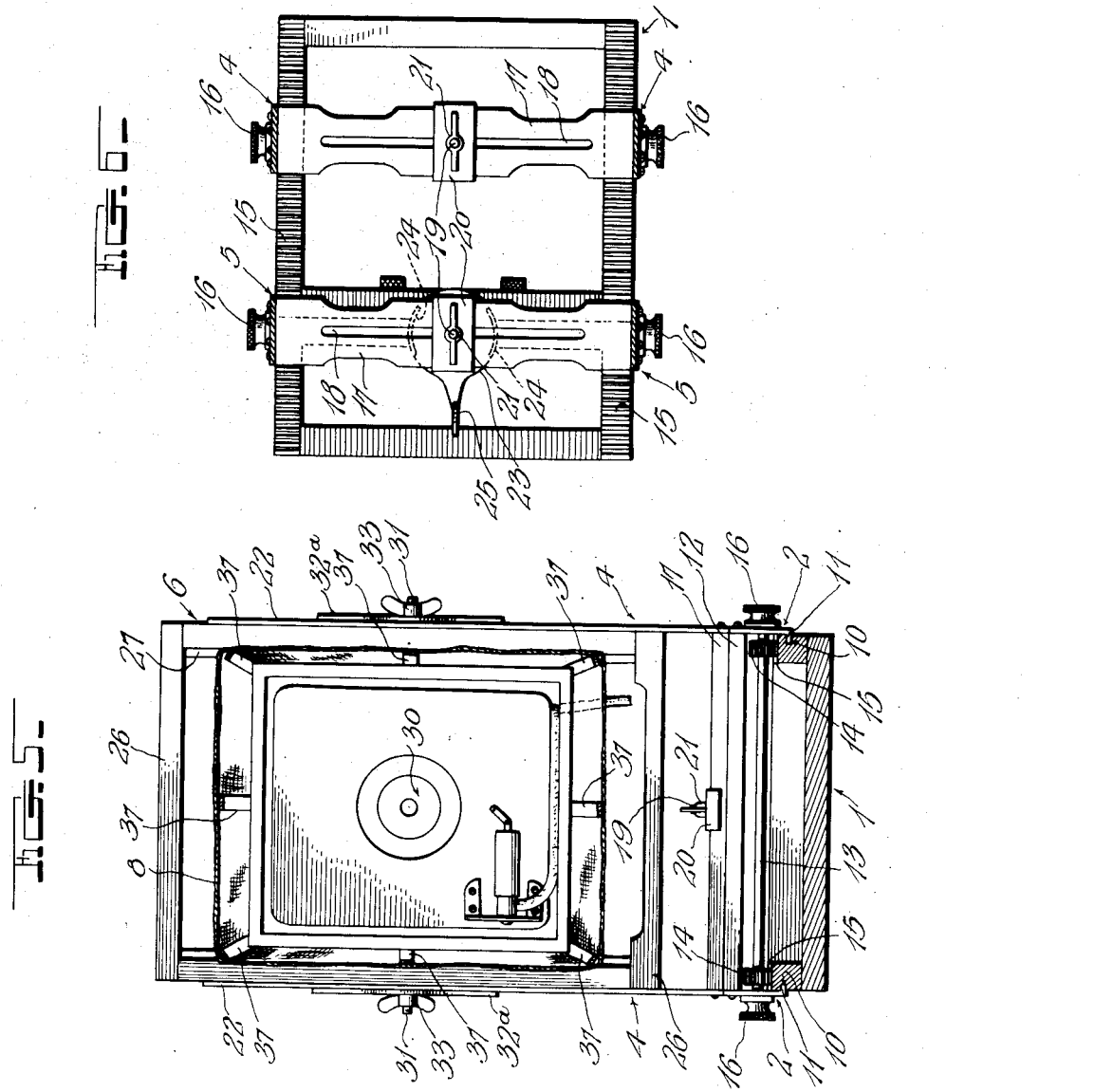

ISAAC V. MORRELL, OF ELGIN, ILLINOIS, ASSIGNOR OF ONE-FOURTH TO J. OTTY MORRELL, OF MONTREAL, QUEBEC, CANADA.

CAMERA.

1,142,904.  Specification of Letters Patent.  Patented June 15, 1915.

Application filed August 31, 1914. Serial No. 859,482.

*To all whom it may concern:*

Be it known that I, ISAAC V. MORRELL, a citizen of the United States, residing at Elgin, in the county of Kane and State of Illinois, have invented certain new and useful Improvements in Cameras; and I do declare the following to be a full, clear, and exact description of the invention, such as will enable others skilled in the art to which it appertains to make and use the same.

My invention relates broadly to improvements in photography and more particularly to cameras.

The primary object of the invention is to improve upon the construction of devices of this character to such an extent as to provide a comparatively simple device which may be employed to great advantage for taking interior photographs and likewise photographs of extremely tall objects and a camera where all parts can be manipulated when using an extremely short focus lens.

In carrying out the above end, a plurality of adjustments are provided whereby photographs of high buildings and the like may be taken from the ground from points extremely close to the object being photographed and whereby such pictures may be taken to equal advantage from comparatively high elevations. In either case, certain of the above mentioned adjustments are employed thus causing the image imprinted upon the plate or the like, to cover the entire area of the same.

In carrying out the above end, since the lens support and the plate support are both adjustable, a secondary object of the invention becomes to provide elastic supports for the usual bellows which is interposed between the lens support and the plate support as is common with devices of this character.

A still further object is to construct the device in the most simple manner consistent with its proper operation.

With the above and minor objects in view, the invention resides in certain novel features of construction, combination and arrangement of parts as will be hereinafter described and claimed and shown in the drawings wherein—

Figure 1 is a side elevation of my improved camera the same being in partially extended position; Fig. 2 is a front elevation of the device with the parts standing as seen in Fig. 1; Fig. 3 is a side elevation showing the positioning of parts upon photographing a rather tall object from a comparatively high elevation; Fig. 4 is a longitudinal section with the parts as seen in Fig. 1; Fig. 5 is a transverse section taken on the line 5—5 of Fig. 4; Fig. 6 is a horizontal section as seen on the line 6—6 of Fig. 4.

In the accompanying drawings I have shown my improved camera as comprising, in general, a base 1, front and rear carriages 2 and 3 slidably mounted thereon, front and rear forks 4 and 5 pivotally and adjustably mounted respectively upon the carriages 2 and 3, a lens support 6 adjustably mounted in the front fork 4, a plate support 7 adjustably mounted in the rear fork 5, and a bellows 8 interposed between the supports 6 and 7 and attached at its opposite ends thereto.

The base 1 may be of any suitable formation and constitutes no part of the present invention but the same coacts to produce a complete article since it is provided with longitudinal guides 10 in which end plates 11 of the front and rear carriages 2 and 3 are slidably mounted, said end plates being connected by transverse bars 12 beneath which transverse shafts 13 are located, said shafts having their opposite ends journaled in the end plates 11 and carrying gears 14 which mesh with racks 15 carried by the base, whereby when said shafts are rotated by suitable knobs 16 thereon, the carriages 2 and 3 may be adjusted longitudinally upon the base.

The front and rear forks 4 and 5 each include transverse longitudinally slotted base bars 17, the slots 18 receiving bolts 19 which rise from the cross bars 12, wear plates 20 and thumb nuts 21 being positioned upon the upper ends of said bolts 19 whereby, when said nuts 21 are tightened, the bars 17 will be locked in adjusted position and whereby, when said nuts are loosened, said bars may be turned around the bolts 19 which constitute upright axes and may be shifted transversely. Rising from the opposite ends of the cross bars 17, are vertically slotted curbed arms 22 which, in connection with said bars 17 constitute the forks 4 and 5.

By reference to the drawings it will be seen that the thumb nut 21 employed at the front of the device is easily accessible at all times while the nut 21 at the rear end thereof becomes inaccessible at times. It, therefore, becomes expedient to provide means whereby the rear fork 5 may be loosened or tightened independently of the movement of the nut 21. For this purpose I have provided a disk 23 which is rotatably mounted upon the rearmost bolt 19 and which is interposed between the rear bars 12 and 17, said disk being provided with a pair of arcuate cams 24 on opposite edges and with an operating handle 25 which projects rearwardly whereby when said disk is turned in one direction the cams 24 will force the rear bar 17 upwardly against the nut 21 thereon but, when said disk is turned in the opposite direction, said bar 17 will be released thereby allowing the rear fork to be turned around its pivot or adjusted transversely.

The lens support 6 includes an upright rectangular frame 26 which may be of any suitable formation and whose upright bars are provided with guides 27 with which the side edges of a lens board 28 are slidably engaged, a thumb screw 29 or other suitable fastening device being provided for the purpose of locking said board 28 against casual movement. As is common with devices of this character, the lens board 28 carries a suitable lens 30 which, in the present instance, is of a comparatively short focus type, and likewise carries a shutter mechanism forming no part of the present invention.

As clearly seen in the various figures of the drawings, the frame 26 is provided with laterally projecting threaded studs 31 which project through slots 32 in the upright arms of the front fork 4, said studs 31 receiving thereon flat leaf springs 32ª which bear at their opposite ends against said arms, and thumb nuts 33 whereby, when said nuts are loosened, the entire frame 26 and the parts carried thereby may be adjusted vertically and whereby, when said nuts 33 are tightened said frame may be locked in vertically adjusted position and may likewise be locked in any one of the positions to which it may be adjusted by rocking around said bolts as pivots.

The plate support 7 may be of any suitable formation for carrying out the objects of the invention and is here shown as including a rectangular frame 34 which is suitably shaped to receive an appropriate plate holder 35 to which the usual focusing cloth 36 may be attached. The frame 34 is provided with laterally extending threaded studs 31' which project through slots 32' formed in the upright arms of the rear fork 5, said studs receiving flat friction springs 32ᵇ and thumb nuts 33' on their outer ends, said springs 32ᵇ bearing against the outer sides of said arms of the rear fork 5 and serving to retain the plate holder 7 in any one of its vertically or arcuately adjusted positions.

The bellows 8 may be of any suitable formation, but as is common with devices of this character, is preferably formed of closely woven black cloth. It need not be corrugated as is common with most forms of bellows since a plurality of elastic bellows supporting elements 37 are provided, said elements being here shown in the form of elastic bands and as being secured at their opposite ends to the lens support 6 and the plate support 7, one element 37 being located in each corner of the bellows while other elements are located within the sides thereof. It will be understood that coil springs could be employed to equal advantage as the elastic elements 37 in which case, the latter will be dispensed with. By this feature of construction, the bellows is maintained in properly extended position regardless of the manner in which the lens and plate supports are adjusted.

Although the operation of the device would probably be thoroughly understood by those familiar with the art to which the invention relates, it may be well to explain that the various adjustments to which the lens support and the plate support may be subjected are provided for the purpose of obtaining a sharp clear cut image which will cover the entire area of the plate or film and in which excessive converging of lines is eliminated.

From the foregoing description taken in connection with the accompanying drawings it will be seen that I have produced a comparatively simple device for carrying out the objects of the invention yet one which will be highly efficient in operation and with which extremely tall objects may be taken from comparatively low or high levels as becomes most desirous. It will further be seen that the bellows will be properly extended at all times this being due to the provision of the elastic supports 37.

I have described my invention with considerable minuteness and have mentioned in the description and the appended claims "a plate support" but it is to be understood that the equivalent of a plate may be employed and that this provision lies clearly within the scope of the present invention.

Having thus described my invention, what I claim is:

1. In a camera, a base, a lens support mounted on said base, a plate support likewise mounted thereon, said supports being mounted for vertical adjustment and to swing on vertical and horizontal axes, and a bellows connected to said supports.

2. In a camera, a base, a lens support mounted on said base, a plate support likewise mounted thereon, the two supports being independently adjustable transversely whereby the same may be moved out of alinement, and a bellows connected to said supports.

3. In a camera, a base, a longitudinally and transversely adjustable lens support mounted on said base, a longitudinally and transversely adjustable plate support likewise mounted thereon, and a bellows connected to said supports.

4. In a camera, a base, a longitudinally and transversely adjustable lens support mounted on said base to swing upon vertical and horizontal axes, a longitudinally and transversely adjustable plate support likewise mounted on said base to swing upon vertical and horizontal axes, and a bellows connected to said supports.

5. In a camera, a base, a vertically, longitudinally and transversely adjustable lens support mounted on said base to swing in vertical and horizontal planes, a vertically longitudinally and transversely adjustable plate support likewise mounted on said base to swing in vertical and horizontal planes, and a bellows connected to said supports.

6. In a camera, a base, a pair of carriages movably mounted thereon, forks supported by said carriages to swing upon vertical axes, a lens support mounted for vertical adjustment in one fork, a plate support mounted for vertical adjustment in the other fork, both of said supports being pivoted to swing upon horizontal axes, and a bellows attached to said supports.

7. In a camera, a base, a lens support and a plate support mounted thereon, a bellows interposed between and connected at its ends to said lens support and to said plate support and a plurality of elastic bellows supporting elements secured at their ends to said lens and plate supports.

8. In a camera, a base, a lens support and a plate support mounted thereon, a bellows interposed between and connected at its ends to said lens support and to said plate support, and a plurality of elastic bellows supporting elements located within the bellows and secured at their ends to said lens and plate supports.

9. In a camera, a base, a lens support and a plate support mounted thereon, a rectangular bellows interposed between and secured at its ends to said lens support and to said plate support, and a plurality of elastic bellows supporting strips secured at their ends to said lens and plate supports, said elements being located at the angles of the bellows.

In testimony whereof I have hereunto set my hand in presence of two subscribing witnesses.

ISAAC V. MORRELL.

Witnesses:
WILLIAM G. PERCE,
E. F. MANN.